United States Patent Office 2,960,559
Patented Nov. 15, 1960

2,960,559

METHOD FOR MAKING HEAVY DUTY BATTERY SEPARATOR

Donald G. Magill, Jr., and Charles B. Williams, Milford, N.J., assignors to Riegel Paper Corporation, New York, N.Y., a corporation of Delaware No Drawing. Filed Apr. 17, 1957, Ser. No. 653,282

6 Claims. (Cl. 136—148)

This invention relates to a battery separator and, more particularly, to a heavy duty battery separator fabricated from a porous resin-impregnated paper. The invention further provides an improved process, in the nature of a secondary treatment, for manufacturing an abrasion-resistant heavy duty battery separator from a porous base sheet of a resin-impregnated battery separator paper without substantially impairing either the ohmic resistance or the porosity of the base sheet.

Although an unusually large variety of treated papers has been tested as possible battery separators, the stringent physical and electrical standards required of a battery separator have precluded the use of most of these papers. A suitable battery separator paper must not only possess a low ohmic resistance together with a high degree of porosity, but the paper also must be able to withstand extensive degradation from the action of the chemical components of the battery cell. The porosity of this special paper must not be such that "trees" of active positive material will penetrate the separator, thereby short-circuiting the battery cell.

The imposition of these stringent requirements upon battery separator paper has led to the development of special equipment and manufacturing techniques for impregnating a sheet of cellulosic material with an acid-resistant resin to obtain a suitable battery separator paper. These techniques are generally based on preventing the formation of an impermeable film of the resin on the paper, for impermeability would destroy the utility of the resin-impregnated paper as a battery separator. To achieve a high porosity as well as a low ohmic resistance, the base sheet of paper is initially impregnated with a phenol-formaldehyde "A"-stage resin, and is then cured in such manner that the resin passes successively through the "B"-, and finally through the "C"-stages. By using this manufacturing technique, a superior battery separator paper made of fibers of less than 20 microns in width may be produced. Other battery separator papers may be produced in much the same manner with the addition, however, to the cotton linters in the beater of a latex emulsion, such as "Hycar 1561," which more specifically may be defined as a mixture of acrylo-nitrile and butadiene and styrene-butadiene rubbers. These battery separator papers are generally made with a thickness of about 30 to 50 points, and are characterized by a low ohmic resistance and by a porosity below 4 seconds, as determined by a Gurley Densometer. Papers meeting these specifications are manufactured by the assignee of this application and have been successfully and widely used in a variety of light-weight battery cells.

The abrasion resistance of commercial battery separator papers, however, is not sufficiently high to permit entirely satisfactory use of these papers as separators in heavy duty batteries. When a standard battery separator paper is used to separate the active components in a heavy duty battery, failure of the battery may occur after only limited usage. These battery failures may be attributed to wearing of the battery separator caused by constant abrasion. To the best of our knowledge, all attempts to improve the abrasion resistance of commercial battery separator paper by further impregnation with resin have been uniformly unsuccessful, since the additional resin in the paper tends to increase the ohmic resistance while decreasing the porosity of the paper. Consequently, manufacturers of heavy duty batteries have been compelled to reject battery separators made from resin-impregnated paper because of their low abrasion resistance.

Using a standard resin-impregnated battery separator paper, we have found that the base sheet of this paper may be further (i.e., secondarily) treated with a resinous coating solution containing a wetting agent to increase the abrasion resistance of the sheet without impairing either its ohmic resistance or porosity. Incorporation of a wetting agent in the coating solution of a phenol-formaldehyde resin prevents the formation of an impermeable film when the solution is applied to the battery separator paper. Accordingly, the process of this invention for manufacturing a heavy duty battery separator comprises treating a porous resin-impregnated battery separator paper with a coating solution containing a phenol-formaldehyde resin and a wetting agent to increase the abrasion resistance of the paper without substantially impairing the ohmic resistance or diminishing the porosity of the base sheet.

The coating solution may be prepared using a variety of commercially-available phenol-formaldehyde resins and compatible wetting agents. Generally, the solutions are prepared in water, but various alcohols, such as methanol and ethanol, may also be used as the solvent component. For the most part, water and alcohol may be used interchangeably. Although dilute coating solutions may be used successfully, it requires increased liquid handling and offers no operating advantages. We have obtained particularly satisfactory results using coating solutions containing from about 25 to 40 percent by weight of resin solids and from about 1 to about 8 percent by weight of a wetting agent.

As indicated previously, treatment of the battery separator paper with an aqueous coating solution containing a phenol-formaldehyde resin and a wetting agent substantially improves the abrasion resistance of the paper without impairing either its ohmic resistance or porosity. Using an arbitrary scale based on an abrasion resistance of "1" for standard battery separator paper and "3" for microporous rubber, the abrasion resistance of the treated sheet is often better than that of microporous rubber. To illustrate this improvement, Table I sets forth the results achieved when a standard battery separator paper was treated with coating solutions containing various concentrations of resin solids and wetting agents. The coating solutions were prepared using a phenol-formaldehyde resin. A small amount of mold lubricant is advantageously added to the coating solution to assist in the release of battery separators from press platens during the rib pressing operation. In addition to the resin, the coating solution also contained the designated concentration (based on resin solids) of a wetting agent, such as a sodium alkyl sulfonate known as "Alkanol WXN." Certain coating solutions were prepared with "Catavar 170" (a water soluble phenol formaldehyde resin) and used water as a solvent, while certain other coating solutions contained "Catavar 127" (an alcohol soluble phenol formaldehyde resin) and employed a denatured ethanol (95%) as solvent.

In each case, the base sheet was satuarted with the particular coating solution. After removal of the water or alcohol by drying, the treated sheet was subjected to a variety of physical and electrical measurements.

*Table I*

| Treating solution | Ohmic resistance | Results p.p. porosity | Abrasion resistance |
|---|---|---|---|
| Catavar 170 at 14.0° Baumé and 2% Durez 11663 and 12% Alkanol WXN. | 0.064 | 5.40 sec./100 cc.[1] | 2+ |
| Catavar 170 at 13.1° Baumé and 2% Durez 11663 and 12% Alkanol WXN. | 0.040 | 4.15 sec./100 cc.[1] | 2+ |
| Catavar 127 at 35% solids and 2% Durez 11663 and 6% Alkanol WXN (can dried). | 0.220 | 5.54 sec./100 cc.[1] | 3++ |
| Catavar 127 at 35% solids and 2% Durez 11663 and 6% Alkanol WXN (air dried). | 0.220 | 6.25 sec./100 cc.[1] | 3++ |

[1] Gurley densometer using ¼ sq. in. orifice and 5 ounce cylinder.

The abrasion resistance of the base sheet is also increased when the coating solution is applied from a coating tower. In such case, the base sheet may be coated either on the wire or felt side (unilaterally) or on both sides (bilaterally). Table II sets forth the results achieved when a heavy duty battery separator was prepared by coating a battery separator paper with an alcoholic coating solution containing 25 percent by weight of "Catavar 127" and 1.5 percent by weight of "Alkanol WXN." The wetting agent comprised 6 percent by weight of the total resin solids in the coating solution.

*Table II*

| | Base paper | Ctg. wire side | Ctg. felt side | Ctg. both sides |
|---|---|---|---|---|
| Basis weight | 175 | 193 | 202 | 224 |
| Cured gauge | 38.5 | 38.5 | 38.5 | 39.0 |
| P.p. porosity | 3.6 | 3.8 | 4.2 | 3.6 |
| Percent vol | 6.7 | 6.8 | 7.8 | 9.1 |
| Percent pickup | | 10.7 | 13.4 | 21.8 |
| Ohmic resistance: | | | | |
| 20 min | .027 | .065 | .056 | .144 |
| 1 hr | .027 | .054 | .048 | .089 |
| 16 hr | .027 | .050 | .045 | .074 |
| Tower speed—f.p.m | | 13.1 | 14.5 | 14.0 |
| Coating nip, mil | | 35.0 | 34.0 | 35.0/34.0 |

In general, the ohmic resistance of the base sheet is not substantially impaired by impregnation with the resin of sufficient wetting agent is added to the coating solution. We have obtained particularly satisfactory results using coating solutions which contained from 6 to 18 percent of wetting agent, based on the weight of the resin solids. The results illustrated in Table III demonstrate that neither the ohmic resistance nor the porosity of the base sheet is substantially impaired when a sufficient quantity of wetting agent is incorporated in the coating solution. However, if an insufficient quantity of wetting agent is used, as in coating No. 1, the ohmic resistance of the resultant separator is markedly impaired. In each example, the coating solution contained 25 percent by weight of "Catavar 127." In addition, coating solution 1 contained 6 percent of "Alkanol WXN," coating solution 2 contained 12 percent of the wetting agent, and coating solution 3 contained 18 percent, all based on the weight of the resin solids. All three coating solutions employed 95 percent ethanol as a solvent.

*Table III*

| | Base paper A | Coating No. 1 | Base paper B | Coating No. 2 | Coating No. 3 |
|---|---|---|---|---|---|
| Basis weight | 206 | 245 | 200 | 234 | 234 |
| Fiber weight | 117 | 103 | 108 | 114 | 119 |
| Gage | 40.5 | 41.0 | 40.2 | 42.0 | 40.0 |
| A.D | 5.1 | 6.0 | 5.0 | 5.6 | 5.8 |
| P.p. porosity | 4.1 | 3.6 | 3.6 | 3.6 | 3.9 |
| Total percent resin | 47.3 | 56.2 | 49.6 | 55.6 | 53.5 |
| Percent vol | 7.9 | 8.7 | 7.3 | 9.0 | 9.2 |
| Percent resin | 43.3 | 51.9 | 46.0 | 51.1 | 48.9 |
| Percent pickup | | 16.0 | | 17.0 | 17.0 |
| Ohmic resistance: | | | | | |
| 20 min | .032 | 1.0+ | .031 | .053 | .038 |
| 1 hr | .029 | 1.0+ | .028 | .044 | .035 |
| 16 hr | .028 | 1.0+ | .027 | .044 | .029 |
| Tower speed, f.p.m | | 7-8 | | 9-10 | 9-10 |
| Coating nip, mil | | 44.0 | | 45.0 | 45.0 |

Increased abrasion resistance may be obtained by increasing the resin content of the coating solution. Table IV sets forth the properties of two heavy duty battery separators prepared by coating a standard battery separator paper with alcoholic solutions containing different concentrations of resin solids. Each solution, however, contained 18 percent of "Alkanol WXN," based on the weight of the resin solids. Roll 1 was treated with a coating solution containing 25 percent by weight of "Catavar 127," while roll 2 was treated with a solution containing 40 percent by weight of the resin solids.

*Table IV*

| | Base paper | Roll 1 | Roll 2 |
|---|---|---|---|
| Basis weight | 203 | 235 | 257 |
| Fiber weight | 110 | 121 | 120 |
| Cured gauge | 39.0 | 40.0 | 40.5 |
| App. density | 5.2 | 6.0 | 6.4 |
| P.p. porosity | 3.5 | 3.5 | 3.8 |
| Percent total resin | 46.8 | 52.8 | 57.9 |
| Percent vol | 7.3 | 8.2 | 9.7 |
| Percent resin | 43.2 | 48.7 | 53.1 |
| Percent pickup | | 13.6 | 21.0 |
| Ohmic resistance: | | | |
| 20 min | .042 | .043 | .059 |
| 1 hr | .032 | .035 | .047 |
| 16 hrs | .028 | .034 | .046 |
| Tower speed, f.p.m | | 9.5 | 11.5 |
| Coating nip, mil | | 50 | 50 |

Greatly improved performance of these heavy duty battery separators in batteries, which have been subjected to severe vibration, has been consistently obtained. The abrasion resistance of these separators is uniformly superior to that of the uncoated separators.

We claim:

1. A secondary treatment for improving the abrasion resistance of a previously resin-impregnated battery separator paper without substantially impairing its ohmic resistance and porosity characteristics, which comprises applying to at least one of the surfaces of said previously impregnated paper a coating solution containing a phenolformaldehyde resin and a compatible wetting agent, said coating solution containing from 25 to 40 percent by weight of resin solids and from 1 to 8 percent by weight of said wetting agent.

2. The process of claim 1, in which the wetting agent is a sodium alkyl sulfonate.

3. The process of claim 1, in which both surfaces of said paper are coated with solution.

4. The process of making battery separator paper which comprises impregnating a base paper with a phenolformaldehyde resin, curing said resin to provide a porous, resin-impregnated separator paper of low ohmic resistance, and improving the abrasion resistance of the previously impregnated paper without substantially impairing its ohmic resistance and porosity characteristics by a secondary treatment, which comprises applying to at least one of the surfaces of said previously impregnated paper a coating solution containing a phenolformaldehyde resin and a compatible wetting agent, said coating solution containing from 25 to 40 percent by weight of resin solids and from 1 to 8 percent by weight of said wetting agent.

5. The process of claim 4, in which the wetting agent is a sodium alkyl sulfonate.

6. The process of claim 4, in which both surfaces of said paper are coated with solution.

References Cited in the file of this patent

UNITED STATES PATENTS 2,662,032 Uhlig et al. ............ Dec. 8, 1953
2,662,107 Uhlig et al. ............ Dec. 8, 1953
2,702,758 Uhlig et al. ............ Feb. 22, 1955